United States Patent [19]

Wottlin

[11] Patent Number: 4,882,509
[45] Date of Patent: Nov. 21, 1989

[54] MOTOR INCORPORATING A SUPERCONDUCTING SHIELD

[76] Inventor: James E. Wottlin, 88 Whispering Pines, Conroe, Tex. 77302

[21] Appl. No.: 215,325

[22] Filed: Jul. 5, 1988

[51] Int. Cl.$^4$ ............................................. H02K 37/00
[52] U.S. Cl. ........................................ 310/46; 310/10;
310/52; 310/86; 310/104; 310/179; 310/156
[58] Field of Search ............... 310/10, 40 R, 104, 106,
310/52, 64, 111, 46, 85, 86, 152, 156, 154, 181,
114, 59, 166, 266, 154, 261, 115, 117, 83, 116,
90.5, 179; 336/DIG. 1

[56] References Cited

U.S. PATENT DOCUMENTS

| | | | |
|---|---|---|---|
| 3,242,418 | 3/1966 | Mela | 310/52 |
| 3,413,502 | 11/1968 | Schwab | 310/181 |
| 3,427,482 | 2/1969 | Massar | 310/10 |
| 3,462,626 | 8/1969 | Kluss | 310/52 |
| 3,564,307 | 2/1971 | Kawabe | 310/10 |
| 3,898,490 | 8/1975 | Wedman | 310/52 |
| 3,940,643 | 2/1976 | Sika | 310/52 |
| 4,151,431 | 4/1979 | Johnson | 310/12 |

Primary Examiner—R. Skudy
Attorney, Agent, or Firm—Gunn, Lee & Miller

[57] ABSTRACT

A motor comprised of stator and rotor and formed of an even number of magnetic poles on both is disclosed. In the gap between the stator and rotor, a rotating shield having a window therein controllably interrupts and controllably permits coupling across the gap between poles of the rotor and stator. In the preferred embodiment, the shield is rotated at the same speed as the rotor in the opposite direction. The shield is made of superconducting material and the motor is operated at superconducting temperatures to position the shield in the gap to interrupt magnetic coupling.

16 Claims, 1 Drawing Sheet

MOTOR INCORPORATING A SUPERCONDUCTING SHIELD

BACKGROUND OF THE DISCLOSURE

This disclosure is directed to a modified motor which is formed permenant rotor and stator of electromagnets, the system comprising a shield which modifies the pole repulsion or attraction inevitably occurring in motor operation.

Motor operation involves a set of magnetic poles on the rotor which pass in near proximity to the stator poles. In a certain portion of the movement of each pole, they are drawn together by magnetic attractive forces and then forced apart by magnetic repulsive forces. There is, however, certain work required when the magnetic attraction or repulsive forces are untimely. That is to say, during rotation of a rotor relative to a stator wherein the poles of the two components pass adjacent to one another, there are occasions where the attraction and repulsion forces slow down the rotor. At that instant, the present apparatus contemplates positioning a shield which does not permit magnetic coupling between the two particular poles in near proximity so that the shield interrupts such magnetic pole coupling and defeats pole to pole coupling at a time when the attraction or repulsion drags down the strength of the motor. The shield material is superconducting material which has the advantage of completely breaking the magnetic field. The shield rotates on a common locus wherein the shield is not required to work and is not attracted to either set of poles. This enables the shield to rotate with a minimum of effort and energy consumption. The shield is driven by a gear box and derives a minimum power from the motor output shaft, and rotates in the opposite direction of the rotor. In this particular embodiment, the shield inscribes an angle enabling the shield to cover a minimum number of poles relative to the stator and travels counterrotationally to the rotor so that it moves to intercept adjacent pole combinations (stator versus rotor) thereby breaking the magnetic coupling while the rotor moves rotor poles toward stator poles with reduced magnetic drag as a result of the untimely attraction or repulsion as mentioned above. In a series of representations, it will be observed that the shield strategically timed in arrival accomplishes these changes in pole to pole coupling. The present apparatus is summarized as incorporating a shield which rotates in a locus between stator and rotor, passing through the gap between stator and rotor poles, wherein the shield is preferably formed of superconducting material. It is ideally counterrotating and has a speed and angular extent around the rotor so that it blocks off selected pole pairs referring to the magnetically coupled pole pairs between stator and rotor. In this regard, the present apparatus is substantially different from that structure shown in U.S. Pat. No. 4,151,431 which is directed to a modified superconducting electromagnetic. The present disclosure, however, is directed to a superconductor shield which functions exactly oppositely of a magnet, namely, it is a barrier to penetration by magnetic lines of flux.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
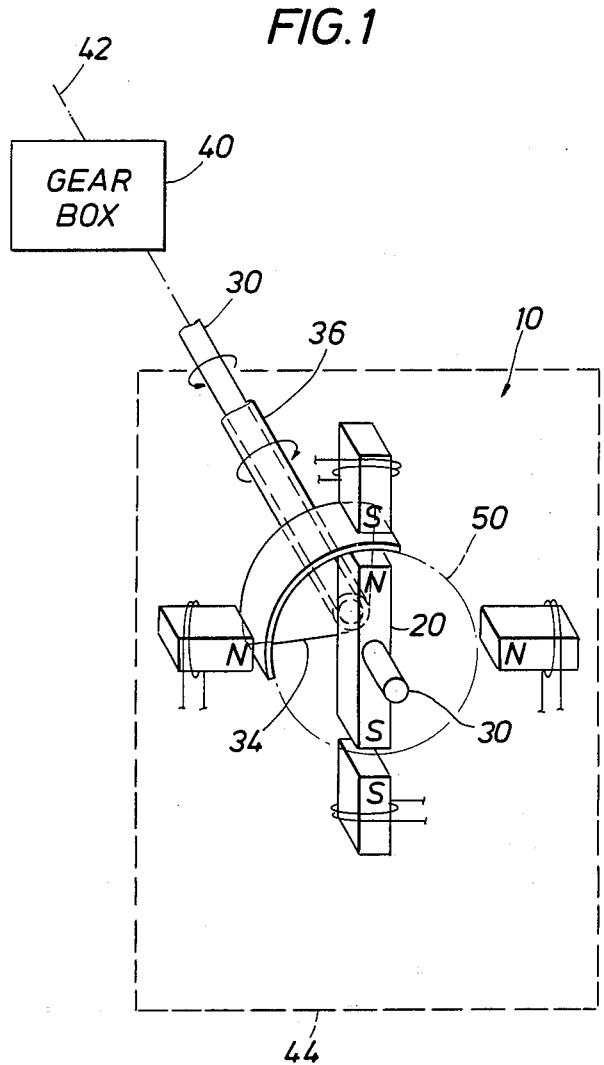
FIG. 1 shows magnetic poles for an electric motor including poles in the stator and rotor wherein a shield in accordance with the teaching of the present invention is located, the rotor and shield being connected with a suitable gearbox which provides rotation for the shield.
Figure 2:
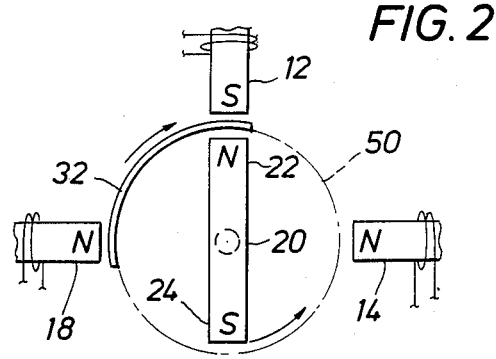
FIGS. 2-5 inclusive show various pole positions wherein the shield of the present disclosure is relocated in a particular sequence to interrupt magnetic flux coupling from pole to pole between stator and rotor.

Attention is first directed to FIG. 1 of the drawings where the numeral 10 identifies a motor constructed in accordance with the teachings of the present disclosure. It incorporates a stator formed of an encircling housing (omitted for sake of clarity) which supports stator electromagnetic poles. In either case, there are a number of poles in the stator, there being an even number of poles, and they are alternately positioned around the circumference, in sequence being north and south alternating. As shown in FIG. 2, one of the poles is identified at 12 while the adjacent pole is 14 and the next pole is 16. The remaining pole is a north pole and is identified at 18. As stated, the number of poles is an even number and is in this instance is four poles, but clearly can be a different number. The stator poles 12, 14, 16, 18 are electromagnets.

Going now to further details, it will be understood that the poles are supported by a circumferential cage or housing which encloses the stator but which has been omitted for sake of a housing is open or which completely encloses the motor. The poles of the stator can be electromagnets as required. The poles are preferably of equal strength and are located at an equal radial distance from the center line axis of the rotating equipment.

The apparatus also incorporates an armature or rotor which here is identified as the member 20 shown in FIG. 2. The rotor is typically an elongate body which is located on the interior of the stator. As is well known, it has an even number of magnetic poles. The poles again are formed of permanent magnets as required. As shown in FIG. 2, it incorporates a permanent magnet pole 22 and an opposite permanent magnet pole 24. The number of poles on the rotor is an even number and they are arranged in alternating north and south fashion as shown in this representation. As will be understood, the rotor 20 is connected with a central shaft with bearing assemblies at both ends, and in this instance, that is identified at 30 in FIG. 1. The sleeved shaft 36 is typically supported by one or more bearings along the shaft of the motor and extends from the cage which comprises the stator, the shaft 30 typically enables a pulley or gear to be connected for deriving power from the motor. The customary arrangement is incorporated in the present invention for the shaft mounting on the rotor within the housing comprised of the surrounding stator. Furthermore, the rotor and stator have a spacing wherein the poles are gapped from one another so that a gap is defined of specified width. This gap has the form of a cylinder on the interior of the stator and surrounding the rotor. In this particular construction, the gap is not the ordinary air gap, but is a space which receives the rotating shield 32. The shield 32 is a partial ring-like shield that surrounds the rotor, and is supported by a spider 34 at one end or at both ends enabling the shield to be connected with a support shaft 36. The shaft 36 positions the shield 32 for concentric rotation in the gap without touching the stator or rotor. The shield is rotated in a fashion to be described. The shield is supported the shaft 36 which is concentric about the output shaft 30. The two concentric shafts connect with a gearbox 40 which is powered by the motor meaning it is rotated or driven by the output shaft 30. The gearbox incorporates a gear system which provides a 1:1 ratio so that the shield rotates at the same speed, but opposite in direction of rotation to the rotor in this particular embodiment. The gearbox has an output shaft 42 which is a power output shaft for delivery of power from the motor.

The shaft 36 thus is driven by the motor at the same speed but in the opposite direction. In the particular relationship of poles between stator and rotor shown and as will be detailed with regard to the remaining figures, this velocity is important in that it positions the shield at a particular location to blank off or interrupt certain magnet pairs as will be described. This shielding effect is achieved between pairs of poles so that the attractive and repulsive forces between stator and rotor poles enhance motor operation and do not interfere with motor operation. Because the shield preferably interrupts the magnetic lines of flux between pairs of poles, the shield is ideally formed of superconducting materials. If it is necessary to reduce the temperature of the motor 10 to levels at which the superconducting phenomenon are sustaining in the shield material, the numeral 44 identifies a refrigeration system which surrounds the motor and reduces the motor operating temperature to the requisite level required for superconducting conditions. The superoonducting shield material is formed in a manner so that its thickness will not inhibit movement in the gap between the rotor and the stator. That is, the shield in the present disclosure is simply required to interrupt magnetic lines of flux but does not have to carry any structural load and does not undergo any stress other than that existing in the shield as a result of shield rotation. As will be understood, the closed refrigeration system which encompasses the motor 10 provides the requisite superconducting temperature for the shield material to the extent required. However, electromagnets may be used in the stator or rotor to provide control of the motor. The motor 10 thus is preferably constructed with permanent magnets in either the stator or rotor, it being typically more convenient to use permanent magnets on the rotor so that the stator magnets are eleotromagnets. This avoids commutating through brushes and the like to connect to the rotor. The stator, however, is normally constructed of eleotromagnets, and they are provided with electric current in a timed sequence so that the motor will rotate. The starting windings, starting coil and other equipment to get the motor up to speed have been omitted for sake of clarity. Some heat might be liberated in the coils comprising the electromagnets of the stator, but that can be routinely removed by the refrigeration system 44 to the extent cooling is required.

Figure 3:
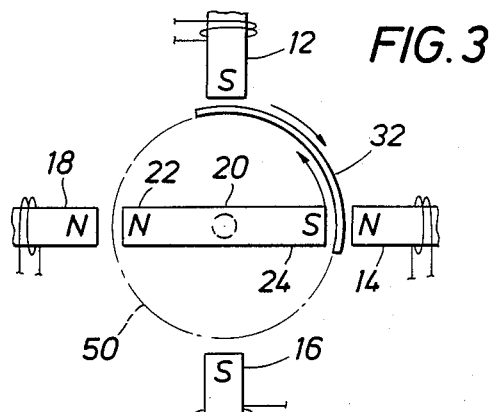
Figure 4:
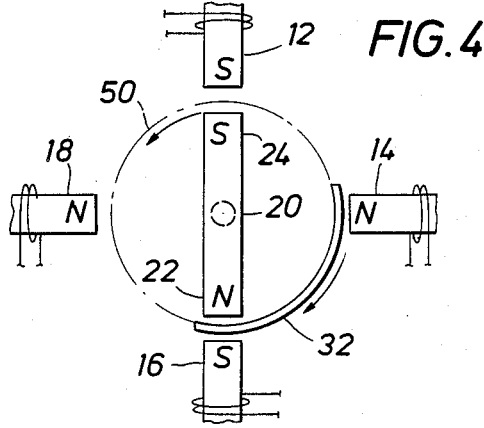
Figure 5:
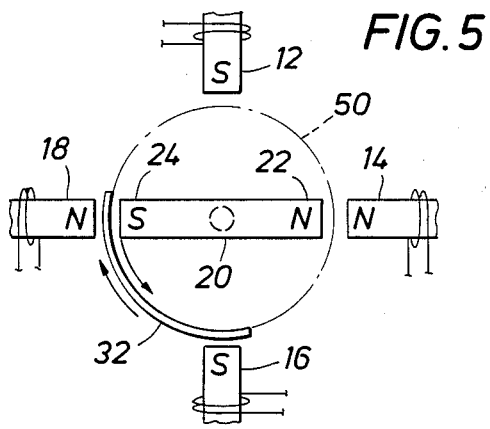

Going now to FIGS. 2-5 to be considered jointly, the following sequence of operation is shown. In FIG. 2 assume that the motor is rotating at some speed, the precise speed not being specified. As shown in FIG. 2 of the drawings, the pole pair of 16 and 24 are in a repulsive condition. The rotating rotor is pushed away by the repulsive force between the poles 16 and 24, and also attrracted by the force between the poles 24 (rotor) and 14 (stator). At that instant, the shield is located as illustrated. The shield interrupts the magnetic coupling between the poles 12 and 22 so that there is no coupling between them. The directions of rotation are indicated by the arrows as shown in FIG. 2. Consider then the transition that occurs from FIG. 2 to FIG. 3 a situation where the rotor moves through 90° of rotation. In this particular instance, the poles 22 and 18 are brought it near proximity. As they approach one another, the shield 32 is between the pole 24 (rotor) and stator poles 12 and 14 as show by the progression between FIGS. 2 and 3. The shield prevents flux coupling until the poles 18 and 22 come into near proximity. This is a repulsive pair which in conjunction with the attraction between poles 22 (rotor) and 16 (stator) forces the rotor to continue in its rotation so that the magnetic coupling is shown in FIG. 3 boosts the rotor with an impulse resulting from magnetic coupling. In the next sequence or in the change from FIG. 3 to FIG. 4, rotation of the rotor continues in a CCW direction so that the poles 12 and 24 are brought into operative relationship That is, FIG. 4 shows them at the instant il time where the repulsive force is maximum, and inductive force is next to come into play and a torque is instantaneously applied to the rotor as the forces peak. As will be understood in the sequence between FIGS. 2-5 there is always a pair of piles building up to a peak repulsive force which in connection with the peak attractive force drives the rotor, the repulsive and attractive forces providing torque to the rotation of the rotor.

Consider now the operation of the shield 32. The shield 32 is placed strategically so that it interrupts certain pairs of poles. For this reason, it is not necessary for the shield to pan a substantial portion of the circumference around the rotor. Ideally, the shield is made of shield material with appropriate windows and in this instance, the shield is shown to have an arc of slightly greater than 90°. The remaining of the shield represents a shield window. The window 50 in the shield in conjunction with the shield limits the pole up. Moreover, this pole shielding process contemplates the shield rotating at a rate or velocity connected with the rotor through the gearbox so that there is synchronization of movement of the counterrotating parts. This means that there is a correlation between the position of the shield and window relative to selected pole pairs.

Consider for descriptive purposes the shielding action that occurs at the shield 32. The shield when located between a pair of opposing or attracting poles prevents magnetic coupling through the shield in light of the fact that the shield is made of superconducting material. Magnetic lines of flux do not penetrate or pass through the shield. Rather, there simply is no magnetic coupling. Perhaps a better way to phrase it is that the shield completely blanks off magnetic coupling. The location of the shield determines the extent of decoupling. The shield is rotatively moved into a position between two poles as they approach one another relatively speaking, and is at that location particularly when the two poles are immediately opposite one another at their closest proximity. The shield is thus instrumental in altering the negative torque acting on the rotor. That is, the shield is intended to blank off certain poles while the window in the shield permits other pole pairs to match up. It is this sequence of blanking off and permitting magnetic coupling that enables proper operation of the equipment.

For convenience purposes, the shield can be counterbalanced by placing an equal and opposite weight on the spider 34. In other words, the shield 32 can be counterbalanced by an opposing shield portion which is made of material not significant to magnetic coupling. Such material can be for example a plastic cylindrical portion which, for magnetic purposes, simply is not instrumental in the magnetic reaction occurring between stator and rotor poles. This would be a plastic window, or the whole shield could be fabricated of plastic, with portions of it incorporating super conductive material.

The foregoing describes the preferred embodiment, and sets forth this embodiment in a simplified context wherein the rotor has two poles and the stator has four. As will be understood, the number of poles on the rotor and stator can be varied.

The structure comprising the preferred embodiment and other embodiments are encompassed within the scope of the claims which are appended.

What is claimed is:

1. A motor which comprises:
   (a) a stator formed of a plurality of magnetic poles the poles being arranged in alternate north and south poles at an instant wherein the stator positions stator poles in a circular arrangement;
   (b) a rotor positioned within said and adapted to be rotated by motor action wherein said rotor is formed of alternating north and south magnetic poles;
   (c) said rotor rotating as a result of attraction and repulsion between said rotor and stator poles and wherein said stator and rotor define a gap therebetween circumferentially about said rotor; and
   (d) a rotating shield means having a window therein, said shield means and window blanking off selected attractive and repulsive pole combinations across said gap, wherein said shield prevents selected magnetic coupling across said gap.

2. The apparatus of claim 1 wherein said shield is formed of superconducting material and prevents magnetic coupling across said gap 3. The apparatus of claim 2 wherein the poles on said stator are electromagnets, and juxtapositioned magnet pairs of said rotor and stator occur during rotation controlled across said gap by said shield and the window in said shield.

4. The apparatus of claim 3 including means for rotating said shield opposite the direction of rotation of said rotor.

5. The apparatus of claim 4 including means for rotating said shield at a speed related to the speed of said rotor.

6. The apparatus of claim 5 including means for cooling said motor and for cooling said shield to superconducting temperature levels wherein said shield is made of superconducting materials and said shield prevents magnetic coupling 7. The apparatus of claim 1 wherein the poles on said stator are electromagnets, and juxtapositioned magnet pairs of said rotor and stator occur during rotation controlled across said gap by said shield and the window in said shield.

8. The apparatus of claim 7 including means for rotating said shield opposite the direction of rotation of said rotor.

9. The apparatus of claim 8 including means for rotating said shield at a speed related to the speed of said rotor.

10. The apparatus of claim 9 including means for cooling said motor and for cooling said shield to superconducting temperature levels wherein said shield is made of superconducting materials and said shield prevents magnetic coupling therethrough.

11. The apparatus of claim 1 including means for rotating said shield opposite the direction of rotation of said rotor.

12. The apparatus of claim 11 including means for rotating said shield at a speed related to the speed of said rotor.

13. The apparatus of claim 12 including means for cooling said motor and for cooling said shield to superconducting temperature levels wherein said shield is made of superconducting materials and said shield prevents magnetic coupling therethrough.

14. The apparatus of claim 2 including means for rotating said shield at a speed related to the speed of said rotor.

15. The apparatus of claim 14 including means for cooling said motor and for cooling said shield to superconducting temperature levels wherein said shield is made of superconducting materials and said shield prevents magnetic coupling therethrough.

16. The apparatus of claim 2 including means for cooling said motor and for cooling said shield to superconducting temperature levels wherein said shield is made of superconducting materials and said shield prevents magnetic coupling therethrough.

* * * * *

UNITED STATES PATENT AND TRADEMARK OFFICE
CERTIFICATE OF CORRECTION

PATENT NO. : 4,882,509

DATED : November 21, 1989

INVENTOR(S) : JAMES E. WOTTLIN

It is certified that error appears in the above-identified patent and that said Letters Patent is hereby corrected as shown below:

Column 1, line 7 change "permenant" to --permanent-- and

Signed and Sealed this

Twenty-second Day of January, 1991

Attest:

HARRY F. MANBECK, JR.

*Attesting Officer*      *Commissioner of Patents and Trademarks*